United States Patent [19]

Marsch

[11] Patent Number: 5,261,771

[45] Date of Patent: Nov. 16, 1993

[54] MULTIPLE USE FREIGHT DECK

[76] Inventor: Dennis L. Marsch, General Delivery, Libau, Manitoba, Canada

[21] Appl. No.: 894,624

[22] Filed: Jun. 5, 1992

Related U.S. Application Data

[63] Continuation-in-part of Ser. No. 611,689, Nov. 8, 1990, abandoned.

[51] Int. Cl.[5] .................................. B65D 19/12
[52] U.S. Cl. .................................. 410/52; 108/56.1; 220/1.5; 206/600
[58] Field of Search ................. 105/371, 372; 410/44, 410/46, 52; 220/4.08, 4.09, 1.5; 296/39.2, 37.5, 39.1; 108/53.1, 55.1, 56.1; 206/600

[56] References Cited

U.S. PATENT DOCUMENTS

| | | | |
|---|---|---|---|
| 1,514,055 | 11/1924 | Lawson . | |
| 2,916,178 | 12/1959 | Arthur | 108/56.1 X |
| 2,956,763 | 10/1960 | D'arca | 206/598 X |
| 3,499,398 | 3/1970 | Murray | 108/56.1 X |
| 3,530,830 | 9/1970 | Smith | 105/371 X |
| 3,593,673 | 7/1971 | Loomis | 105/370 X |
| 3,620,388 | 11/1971 | Mansson | 108/53.1 X |
| 3,664,273 | 5/1972 | Howe | 108/53.1 X |
| 3,897,971 | 8/1975 | Evans | 105/372 X |
| 4,099,640 | 7/1978 | Nessfield et al. | 220/1.5 X |
| 4,240,359 | 12/1980 | Howe | 108/53.1 |
| 4,319,732 | 3/1982 | Godfrey | 108/53.1 X |
| 4,353,520 | 10/1982 | Jansson | 108/55.1 X |
| 4,453,471 | 6/1984 | Herrington et al. | 108/56.1 X |
| 4,638,744 | 1/1987 | Clive-Smith | 108/56.1 X |
| 4,824,137 | 4/1989 | Bolden | 108/56.1 X |
| 4,875,731 | 10/1989 | Ruiz | 296/39.2 X |
| 4,913,061 | 4/1990 | Youngblood | 410/26 X |

FOREIGN PATENT DOCUMENTS

| | | | |
|---|---|---|---|
| 468367 | 9/1950 | Canada . | |
| 744244 | 10/1966 | Canada . | |
| 1009152 | 4/1981 | Canada . | |
| 1529431 | 10/1978 | United Kingdom | 410/24 |
| 1567942 | 5/1980 | United Kingdom | 206/600 |

Primary Examiner—Michael S. Huppert
Assistant Examiner—James T. Eller, Jr.
Attorney, Agent, or Firm—Adrian D. Battison; Murray E. Thrift; Stanley G. Ade

[57] ABSTRACT

A deck structure for use in loading a transportation vehicle includes a main deck portion having a plurality of parallel spaced elongate rail members attached at each end to a sleeve together with a pair of support portions each formed from parallel rail members similar to the rail members of the deck portion attached at one end to a pipe inserted in the sleeves of the deck portion. This allows each side portion to pivot relative to the main deck portion about the axis of the pipe. The rail members are perforated transversely and have channels longitudinally which allow the communication of air. The rail members of the side portions are interleaved with the rail members of the main deck portion so that the side portions can fold to a collapsed condition within the plane of the main deck portion. The device can be used to support a second load above a first load on the floor of the vehicle; to act as a bulkhead across the vehicle; to provide air channels along the sides and/or floor of the vehicle.

7 Claims, 4 Drawing Sheets

MULTIPLE USE FREIGHT DECK

This application is a continuation-in-part of application, Ser. No 611,689, filed Nov. 8, 1990 which is now abandoned.

FIELD OF INVENTION

This invention relates to the field of freight decks, and more particularly to adjustable freight decks used in semi-trailers or other transportation vehicles.

BACKGROUND OF THE INVENTION

There are many potential problems associated with the transport of goods by semi-trailers. It is often the situation that the space within the trailer is not efficiently used. It is also common that damage to goods occurs as a result of poor loading or stacking methods, as well as poor air circulation for perishable loads. Problems such as these make the transportation of goods less cost efficient.

A review of the prior art reveals Canadian patent 468,367 which is a horizontal load supporting platform for use in freight cars. The device is however firmly attached to the walls of freight cars and not easily moved.

Canadian patent 1,099,152 describes a folding pallet of relatively heavy-duty construction. It is constructed in a manner so that it may stack one on top of the other. It does not however provide for any air circulation.

Canadian patent 744,244 describes a floor mat to facilitate ventilation in storage areas, however it has no means of elevation.

There is no readily portable device that allows a stacking of goods within a trailer, while also allowing adequate air circulation.

SUMMARY OF THE INVENTION

It is an object of the present invention to provide a freight deck for use in a transportation vehicle so that the space within a semi-trailer is utilized effectively and efficiently, as well as to provide a decrease in the damage to the goods being transported. It is also an object of the present invention to allow the owner to utilize his trailer in a way that allows him or her to securely carry the maximum allowable load, thereby making the operation more cost efficient.

In one aspect of the present invention, there is provided a freight deck device for use in a transportation vehicle comprising a planar rectangular main deck portion having a plurality of parallel elongate rail members connected together with each of the rail members extending longitudinally from one end of the main deck portion to an opposed end, a first planar rectangular side portion and a second planar rectangular side portion, each of said planar side portions comprising a plurality of parallel elongate rail members connected together with each of the rail members of a respective one of the planar side portions extending from one end of the planar side portions to an opposed end, wherein each rail member of each of the main deck portion and the side deck portion including two parallel side surfaces, a top surface and a bottom surface and means defining at least one air communication channel therealong within the bounds defined by said top, bottom and side surfaces, pivot coupling means connecting one end of the planar side portions to a respective one of the ends of the main deck portion for pivotal movement about a pivot axis at the end of the side portion and of the end of the main deck portion and lying in the plane of the side portion and the plane of the main deck portion so as to allow movement of the side portion from a folded position along side and substantially coplanar with the main deck portion through ninety degrees to a first position substantially at right angles to the main deck portion and through a further ninety degrees to a second position coplanar with the main deck portion and extending outwardly therefrom, the length of each of the side portions from said one end thereof to said opposed end being no greater than one half of the length of the main deck portion, the rail members of the main deck portion being offset relative to the rail members of each side portion in a direction longitudinal of the respective pivot axis such that the rail members of the side portion lie between rail members of the main deck portion in said folded position with a thickness of the main deck portion and the side portion combined in a direction transverse to the plane of the main deck portion being substantially equal to the thickness of the main deck portion alone.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
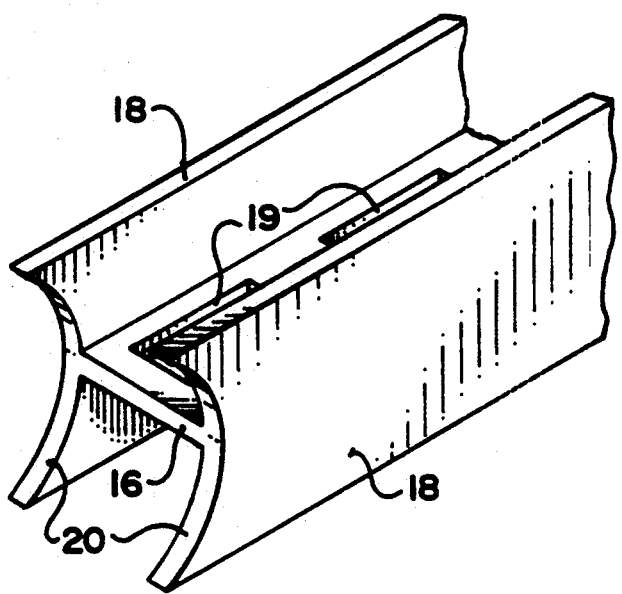
FIG. 1 is an isometric view of one elongate rail member of the embodiment of FIG. 4.
Figure 2:
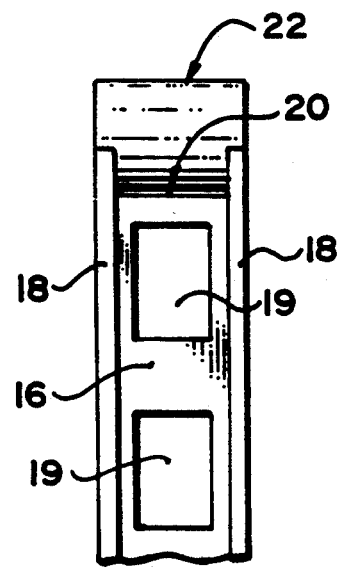
FIG. 2 is a top view of the rail member of FIG. 1 with sleeve integrally attached.

The preferred embodiment of the present invention is comprised of a planar main deck portion 10, pivotally attached to planar side support portions 12. The deck is comprised of a plurality of parallel elongate H-frame beams 14, each beam extending along the full length of the main deck portion. Each beam is comprised of a pair of elongate flanges 18 attached by an integral elongate web 16. When viewed in cross-section, as shown in FIG. 1, the beam 14 has an H-configuration. Along the transverse rail 16 there is a plurality of longitudinally spaced openings 19.

The H-beam 14 is machined or cut at both ends of the beam to form a partially arcuate end piece 20 of the beam 14.

A transverse sleeve 22 is welded to the end of the H-beam 14. The sleeve 22 is of the same width as the H-beam and its outer surface fits within the arcuate configuration of the end of the H-beam 14. The resultant structure is an H-beam 14 with an integrally attached transverse sleeve 22 at each end.

Figure 3:
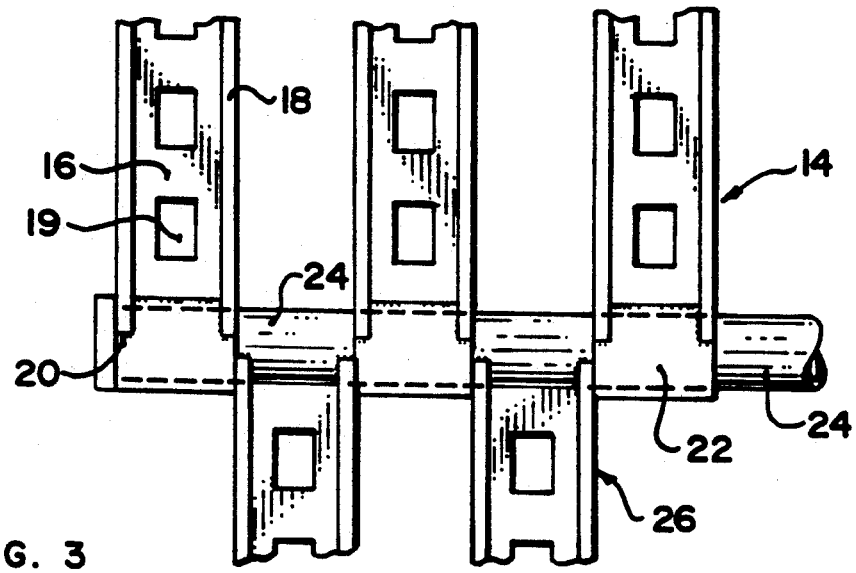
FIG. 3 is a top plan view of one part of the embodiment of FIG. 4 showing the coupling between the main deck portion and one side portion.

Each side portion comprises an elongate pipe 24 with a plurality of further H-beams 26 with the second H-beam support member 26 attached directly to the pipe 24. The support H-beam 26 is also machined at one end to fit directly on the pipe 24 to which it is welded. The beams 26 are spaced longitudinally of the pipe 24 so that the beams 14 of the main support deck are arranged alternately with the beams 26 of the side support member. The resultant structure is comprised of two elongate pipes 24 with deck beams 14 pivotally attached thereon, and alternating along the pipes 24 with fixedly attached support beams 26. This alternating structure is best shown in FIG. 3.

The deck beams 14 are attached to both pipes 24 which lie parallel at respective ends of he beams and therefore result in a planar body 10. The support beams 26 on each side of the planar deck 10 are attached to the pipe 24 and aligned in the same direction. As a result, when pipe 24 on one side of the planar deck 10 is rotated, all the attached support beams 26 on that side move in the same direction, and are essentially parallel with each other at all times. The side support portions 12 can thus pivot from a closed or folded position in which the beams 14 and the beams 16 are substantially coplanar with the pipes 24, to a first open position in which the side support portions are substantially at right angles to the main deck portion and to a second open position in which the side support portions lie coplanar with the main deck portion but extend outwardly therefrom at 180° thereto.

Figure 6:
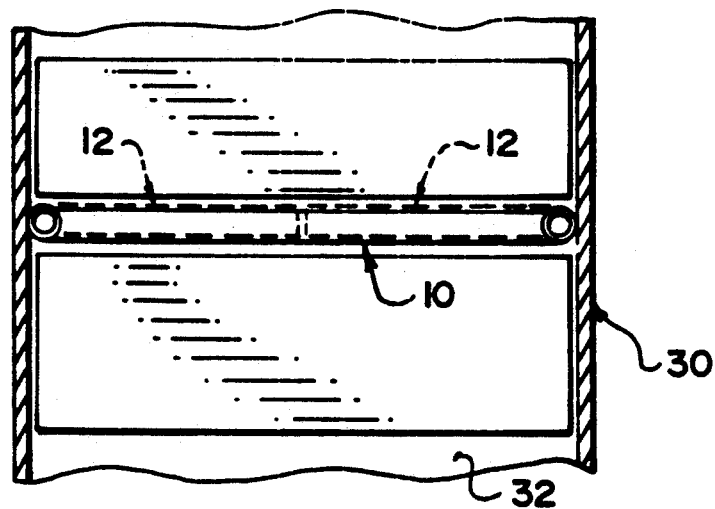
FIG. 6 is a side view of the embodiment of FIG. 4 in the folded position with the plane of the deck perpendicular to the floor of the vehicle between two sections of a load in the vehicle showing the vehicle in horizontal cross-section.

The length of the side portions 12 is such that, as shown in FIG. 6, they can fold inwards with the ends thereof remote from the pipes 24 substantially touching. Thus the length of each is substantially one half of the length of the main deck portion.

As with the deck H-frame beam, there is positioned along the web of the support H-beam 26, a plurality of openings 19 therethrough. The unattached end of the support beam 26 is not machined and remains a straight flat edge to rest on a surface, if the deck is in the first open position.

When in use, the deck provides a means of elevated support, as well as allowing adequate air circulation through the structure. When the device is in the folded position, it may or may not be used, depending upon the load. As the attached deck beams 14 are positioned adjacent the support beams 26 along the pipe 22, the support beams 26 fold under the deck portion 10 of the device and slideably fit between the deck beams 14 so that the deck beams 14 and the support beams 26 become substantially coplanar with each other. As the side adjacent beams 14 and 26 along the pipe 24 are essentially in contact when in the folded position, there is little if any space between the deck beams 14 and the support beams 26 when folded. As there is a plurality of perforated openings 19 along the elongate web of the deck beams 14 and the support H-beam members 26, there continues to be air circulation through the device, even in the folded position both in the longitudinal and transverse directions. Thus the spaces above and below the web of the H-beam act as longitudinal channels within the bounds of the sides, top and bottom surfaces of the beam. The openings 19 through the deck and support beams also result in a lighter device, making the device readily portable.

The edges along the top edge of the elongate flanges 18 of the deck and support H-beams, may be grooved or nurled, to provide a better traction for either a person or a load.

The deck is functional in both the open and folded positions. In the open position, the device fits into a semi-trailer so that the side supports 12 align with the inner side walls 30 of the trailer in a generally perpendicular manner. A standard trailer chamber width is usually 96" or 102", and the length of the main deck portion may be constructed to fit one of these dimensions in either the open or closed position.

The length of the side support beams 28, on the embodiment described, are less than half of the length of the deck beams so that both side supports fold under and fit within the underside of the deck 10 in the folded position.

The deck 10 and side supports 28 may be constructed of a variety of materials, and of different strengths. The beams 14 and 26 and pipe 24 should be of heavy-duty construction when used to support a heavy load and, accordingly, may be larger to support larger loads. The dimensions of the structure will also vary with the intended purpose and size of the trailer. Another possible embodiment of the present invention (not shown) could include a latch that could keep the sidesupport in the open position.

Figure 4:
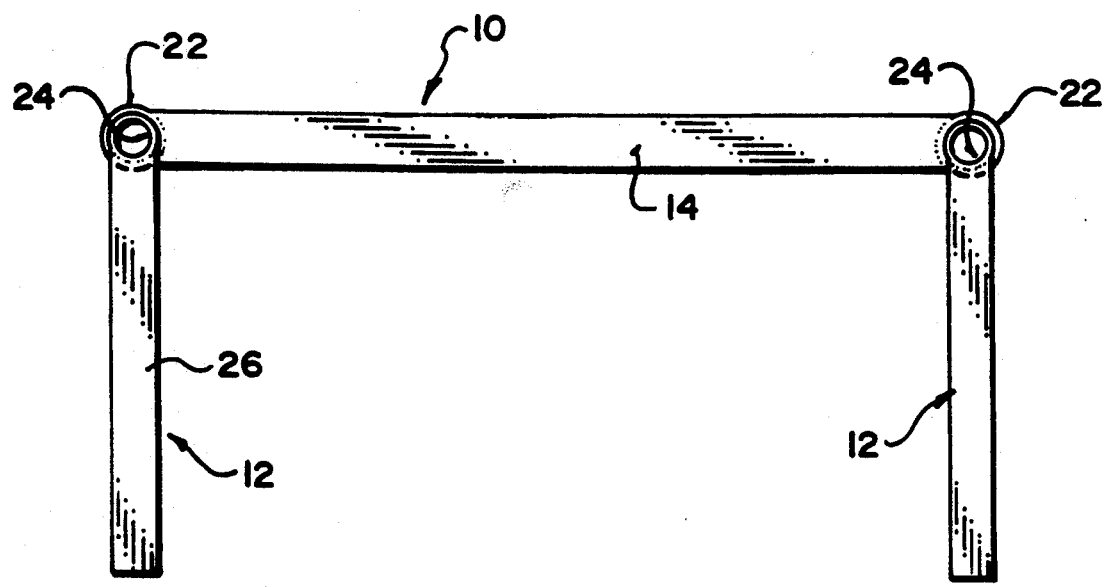
FIG. 4 is a side elevational view of the preferred embodiment of the invention in the open or first position.

The deck may be used in a variety of positions for a variety of functions. In the open position as shown in FIG. 4, the deck may be used to double deck or stack loads. It would allow a lighter load to be carried with a heavy load by extending the side supports and putting the lighter load on the elevated deck, above the heavy load that is on the floor 32 of the trailer.

The device is easily moved within a trailer or from trailer to trailer. It allows the operator to utilize the space within his trailer more effectively. The device, when used in any of its possible positions, can help to minimize damage by overstacking of goods by providing an additional level within a semi-trailer to split the load. It also makes maximum use of the vertical space within a trailer, as well as providing a more efficient loading and unloading, which saves on packaging and pre-shipping costs.

Figure 7:
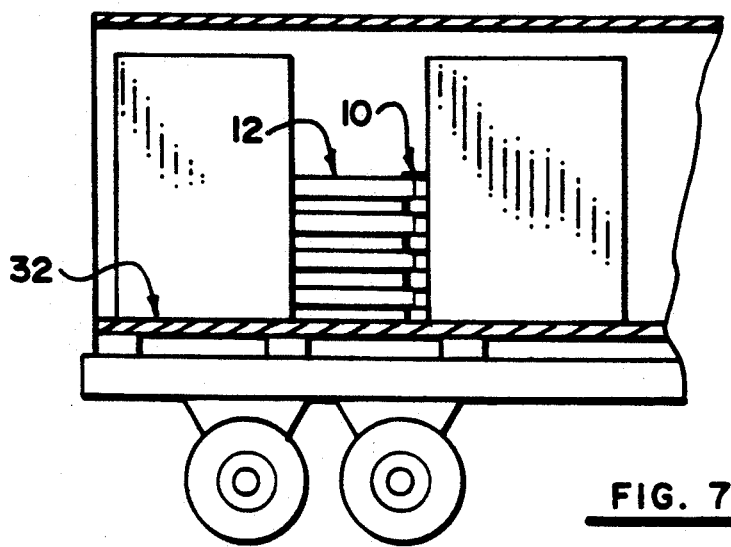
FIG. 7 is an end view of the preferred embodiment in the open position with the plane of deck perpendicular to the floor between two sections of a load within the vehicle showing the vehicle in vertical cross-section.

As the beams of the device are perforated, there is air passage therethrough, allowing for the transport of perishable goods that require good air circulation or temperature control. These perforations thus result in less spoilage in perishable loads. The device may be used in either its open or folded position to promote circulation. The device may also be used as a spacer or bulkhead within the trailer compartment to separate or support loads as necessary. It also may be used in its closed position (FIG. 6), on its side (FIG. 7), or against the wall, to space or secure a load of any kind.

Figure 5:
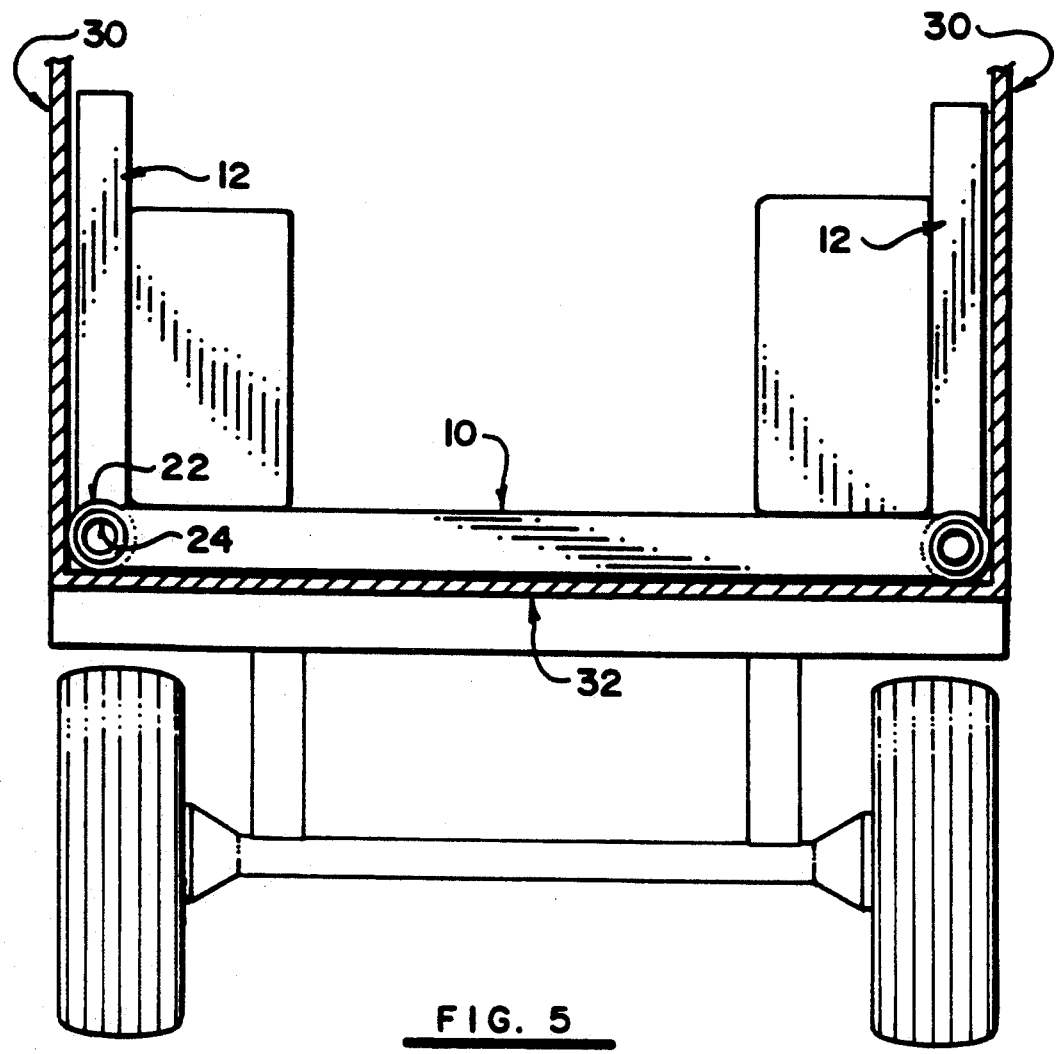
FIG. 5 is a side view of the embodiment of FIG. 4 in the open position with the main deck portion on the floor of a vehicle and side portion extending upwardly along the inside walls of the vehicle.

The open device may also be used upside down (FIG. 5) to allow air flow between the load and the floor as well as between both sides of the trailer compartment. The devices may also be stacked to space or secure loads as necessary.

Figure 8:
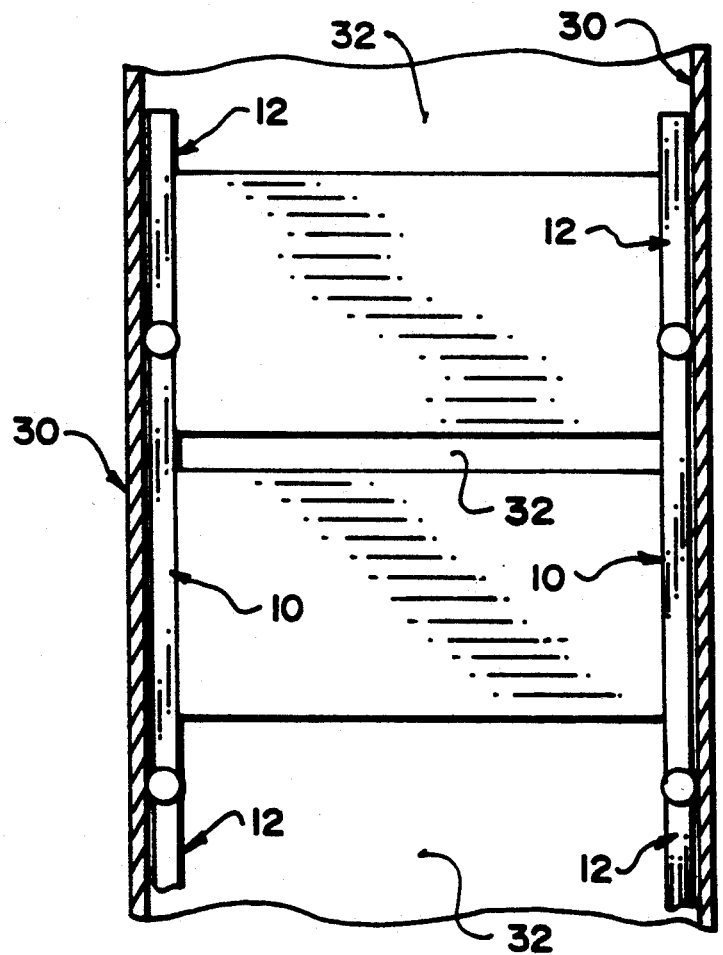
FIG. 8 is a view similar to that of FIG. 6 showing the vehicle in horizontal cross-section with the embodiment of FIG. 4 in the fully opened position along one side of the vehicle.

The device may be used with the deck portion flat against the floor or side of the trailer, with the planar side supports extending outwardly at 180° degrees from the deck portion, (see FIG. 8). This provides an extended surface, raised above the floor, for added air circulation or a larger area.

The device may also be used in conjunction with a load lock device that is well known to those knowledgeable in the art, to provide a more secure load. It is also possible that a load that is too large for one deck could straddle two decks in the open or folded position, that have been pushed together. This would prevent the tipping of a deck, with a large load, in the elevated position.

As shown the H-beams 26 of each of the side support portions are held in the planar parallel relationship by the cooperation with the pipe 24. In an alternative arrangement (not shown) the H-beams 26 are instead attached to sleeve members similar to the sleeve members 22 so that a separate pipe is inserted through all of the sleeve members in a row to take up the position shown in FIG. 3. In this case the H-beams are held in the planar parallel relationship by additional straps attached on one side surface of the H-beams so as not to interfere with the folding action in which the H-beams collapse to interleave with the H-beams of the main deck portion.

In a further alternative arrangement, the number of the H-beams 26 can be reduced so that there are some spaces between the H-beams 14 which do not include a corresponding H-beam 26 but are defined instead simply by spacers provided on the pipe 24.

In a yet further alternative arrangement (not shown), the H-beams can be replaced by tubular folded metal bodies which have a substantially constant cross-section but are shaped with various folds both internal and external to provide the necessary structural strength with minimum weight. The folded metal can also be punched with perforations to allow penetration of air into the tubular interior again allowing the communication of air longitudinally and transversely to the beam.

Figure 9:
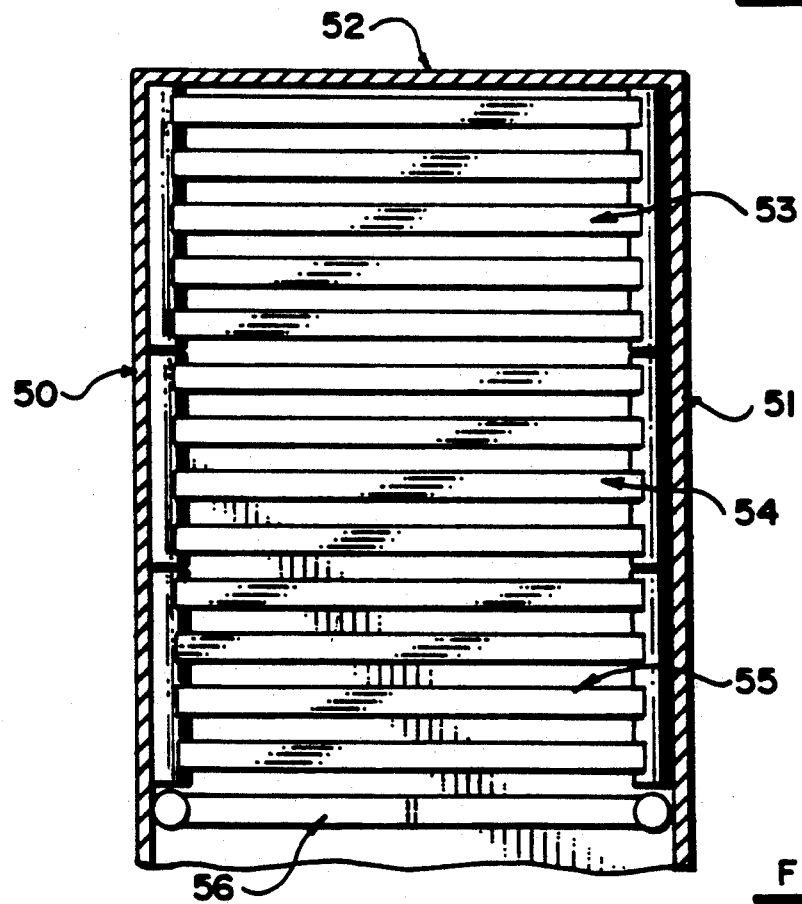
FIG. 9 is a schematic view of a vehicle taken in cross-section showing a further arrangement of the freight deck in use.

Turning now to FIG. 9 there is shown a further arrangement for use of the freight deck described above. In this arrangement there is shown a horizontal cross-section through the side walls 50, 51 and end wall 52 of a trailer to be loaded. In this arrangement three of the freight decks are arranged side by side across the width of the truck as indicated at 53, 54 and 55. Each of these freight decks is in the arrangement in which the leg portions extend vertically downwardly along the side walls 50 and 51 respectively and the main deck section extends across the width of the trailer at a height spaced from the floor by the length of the legs. This provides a deck at a position spaced from the floor under which can be positioned products to be carried which are not crated and which need protection from other objects within the truck. This compartment is then closed by a further one of the freight decks indicated at 56 arranged on its side so as to close the end of this compartment.

Since various modifications can be made in my invention as hereinabove described, and many apparently widely different embodiments of same made within the spirit and scope, it is intended that all matter contained in the accompanying specification shall be interpreted as illustrative only and not in a limiting sense.

I claim:

1. A transportation vehicle comprising a vehicle body having a floor and two parallel side walls each upstanding from the floor along a respective side of the floor and a freight deck device for use in the transportation vehicle comprising a planar rectangular main deck portion having a plurality of parallel elongate rail members connected together with each of the rail members extending longitudinally for a given length from one end of the main deck portion to an opposed end, a first planar rectangular side portion and a second planar rectangular side portion, each of said planar side portions comprising a plurality of parallel elongate rail members connected together with each of the rail members of a respective one of the planar side portions extending from one end of the planar side portions to an opposed end, wherein each rail member of each of the main deck portion and the planar two parallel side portion includes two parallel side surfaces, a top surface and a bottom surface and means defining at least one air communication channel therealong within the bounds defined by said top, bottom and side surfaces, pivot coupling means connecting one end of each of the planar side portions to a respective one of the ends of the main deck portion for pivotal movement of each side portion about a pivot axis at the intersection of the rectangular side portion and the end of the main deck portion and lying in the plane of the side portion and the plane of the main deck portion so as to allow movement of each side portion from a folded position along side of and substantially coplanar with the main deck portion through ninety degrees to a first position substantially at right angles to the main deck portion and through a further ninety degrees to a second position coplanar with the main deck portion and extending outwardly therefrom, the length of each of the side portions from said one end thereof to said opposed end being no greater than one half of the length of the main deck portion, the rail members of the main deck portion being offset relative to the rail members of each side portion in a direction longitudinal of the respective pivot axis such that the rail members of each side portion lie between rail members of the main deck portion in said folded position with a thickness of the main deck portion and the respective side portion combined in a direction transverse to the plane of the main deck portion being substantially equal to the thickness of the main deck portion alone.

2. The vehicle according to claim 1 wherein the length of each of the side portions is substantially equal to one half of the length of the main deck portion.

3. The vehicle according to claim 1 wherein the rail members of the main deck portion are spaced each from the next by a distance sufficient to receive a rail member of the side portion so that the rail members of the main deck portion and the side portions are arranged alternately along said pivot axis.

4. The vehicle according to claim 1 including a plurality of perforations formed in each rail member and allowing air communication therethrough in a direction transverse to the length of the rail member.

5. A transportation vehicle comprising a vehicle body having a floor having a given width and two parallel side walls each upstanding from the floor along a respective side of the floor, and a freight deck device comprising a planar rectangular main deck portion having a plurality of parallel elongate rail members connected together with each of the rail members extending longitudinally for a given length from one end of the main deck portion to an opposed end, a first planar rectangular side portion and a second planar side portion, each of said side portions comprising a plurality of parallel elongate rail members connected together with each of the rail members of the respective side portion extending from one end of the respective side portion to an opposed end, pivot coupling means connecting one end of each of the side portions to a respective one of the ends of the main deck portion for pivotal movement of each side portion about a pivot axis at the intersection of the respective side portion and the end of the main deck portion and lying in the plane of the respective side portion and the plane of the main deck portion so as to allow movement of each side portion from a folded position along side of and substantially coplanar with the main deck portion through ninety degrees to a first position substantially at right angles to the main deck portion and through a further ninety degrees to a second position coplanar with the main deck portion and extending outwardly therefrom, the length of each of the side portions from said one end thereof to said opposed end being no greater than one half of the length of the main deck portion, the rail members of the main deck portion being offset relative to the rail members of each side portion in a direction longitudinal of the respective pivot axis such that the rail members of each side portion lie between rail members of the main deck portion in said folded position with a thickness of the main deck portion and the respective side portion combined in a direction transverse to the plane of the main deck portion being substantially equal to the thickness of the main deck portion alone, the length of the main deck portion being substantially equal to the width of the floor between said side walls, wherein each rail member includes two parallel side surfaces, a top surface and a bottom surface and means defining at least one air communication channel therealong within the bounds defined by said top, bottom and side surfaces and wherein said main deck portion is arranged to lie along one of the floor and the side walls in contact therewith for communication of air therealong.

6. A vehicle according to claim 5 including a plurality of perforations formed in the rail member and allowing air communication therethrough in a direction transverse to the length of the rail member.

7. A transportation vehicle comprising a vehicle body having a floor and two parallel side walls each upstanding from the floor along a respective side of the floor and a freight deck device for use in the transportation vehicle comprising a planar rectangular main deck portion having a plurality of parallel elongate rail members connected together with each of the rail members extending longitudinally for a given length from one end of the main deck portion to an opposed end, a first planar rectangular side portion and a second planar rectangular side portion, each of said planar side portions comprising a plurality of parallel elongate rail members connected together with each of the rail members of the respective side portion extending from one end of the respective side portion to an opposed end, pivot coupling means connecting one end of each of the side portions to a respective one of the ends of the main deck portion for pivotal movement of each side portion about a pivot axis at the intersection of the respective side portion and the end of the main deck portion and lying in the plane of the respective side portion and the plane of the main deck portion so as to allow movement of each side portion from a folded position along side of and substantially coplanar with the main deck portion through ninety degrees to a first position substantially at right angles to the main deck portion and through a further ninety degrees to a second position coplanar with the main deck portion and extending outwardly therefrom, the length of each of the side portions from said one end thereof to said opposed end being no greater than one half of the length of the main deck portion, wherein each rail member includes two parallel side surfaces, a top surface and a bottom surface and means defining at least one air communication channel therealong within the bounds defined by said top, bottom and side surfaces, including a plurality of perforations formed in each rail member and allowing air communication therethrough in a direction transverse to the length of the rail members.

* * * * *